(12) United States Patent
Gupta et al.

(10) Patent No.: US 10,841,802 B2
(45) Date of Patent: Nov. 17, 2020

(54) CALL AUTHENTICATION USING CALL FORWARDING

(71) Applicant: PINDROP SECURITY, INC., Atlanta, GA (US)

(72) Inventors: Payas Gupta, Atlanta, GA (US); David Dewey, Atlanta, GA (US)

(73) Assignee: Pindrop Security, Inc., Atlanta, GA (US)

( * ) Notice: Subject to any disclaimer, the term of this patent is extended or adjusted under 35 U.S.C. 154(b) by 0 days.

(21) Appl. No.: 16/531,501

(22) Filed: Aug. 5, 2019

(65) Prior Publication Data
US 2019/0356782 A1 Nov. 21, 2019

Related U.S. Application Data

(60) Continuation of application No. 16/026,498, filed on Jul. 3, 2018, now Pat. No. 10,375,248, which is a
(Continued)

(51) Int. Cl.
*H04W 12/12* (2009.01)
*H04W 4/50* (2018.01)
(Continued)

(52) U.S. Cl.
CPC ......... *H04W 12/1206* (2019.01); *H04L 67/02* (2013.01); *H04M 3/436* (2013.01);
(Continued)

(58) Field of Classification Search
CPC ......... G06T 7/0012; G06T 2207/10081; G06T 7/11; G06T 7/10; G06T 9/002;
(Continued)

(56) References Cited

U.S. PATENT DOCUMENTS 5,917,817 A 6/1999 Dunn et al.
5,991,617 A 11/1999 Powell
(Continued)

FOREIGN PATENT DOCUMENTS

WO 2018026795 A1 2/2018

OTHER PUBLICATIONS

International Search Report and Written Opinion for corresponding application PCT/US2017/044866 dated Oct. 19 2017.
(Continued)

*Primary Examiner* — Diane D Mizrahi
(74) *Attorney, Agent, or Firm* — Foley & Lardner LLP

(57) ABSTRACT

The invention may verify calls to a telephone device by activating call forwarding to redirect calls for the telephone device to a prescribed destination; receiving a message from a server verifying the call; deactivating call forwarding to receive the call; and reactivating call forwarding when the call is concluded. In another embodiment, the invention may, in response to a telephone device initiating a call to a second telephone device installed with a particular application or software, transmit a message to a server causing it to instruct the second telephone device to deactivate call forwarding. In yet another embodiment, the invention may cause a server to receive a message from a prescribed location indicating that a call was received via call forwarding, and in response to the message, transmit an instruction to the intended recipient to deactivate the call forwarding if the call is verified as legitimate.

20 Claims, 15 Drawing Sheets

Related U.S. Application Data division of application No. 15/445,569, filed on Feb. 28, 2017, now Pat. No. 10,027,816.

(60) Provisional application No. 62/370,551, filed on Aug. 3, 2016.

(51) Int. Cl.
| | |
|---|---|
| *H04M 3/54* | (2006.01) |
| *H04W 4/16* | (2009.01) |
| *H04L 29/08* | (2006.01) |
| *H04M 3/436* | (2006.01) |
| *H04W 12/06* | (2009.01) |
| *H04M 3/42* | (2006.01) |
| *H04L 29/06* | (2006.01) |

(52) U.S. Cl.
CPC .............. *H04M 3/54* (2013.01); *H04M 3/543* (2013.01); *H04W 4/16* (2013.01); *H04W 4/50* (2018.02); *H04W 12/06* (2013.01); *H04L 63/00* (2013.01); *H04L 63/126* (2013.01); *H04L 63/1466* (2013.01); *H04M 3/42059* (2013.01); *H04M 2203/6027* (2013.01); *H04M 2203/6045* (2013.01)

(58) Field of Classification Search
CPC ........... G06T 11/008; G06T 7/12; G06T 7/13; H04W 12/06; H04W 4/021; H04W 4/50; H04W 4/16; H04W 4/14; H04M 3/54; H04M 3/543; H04M 3/5175; H04M 3/5183
See application file for complete search history.

(56) References Cited

U.S. PATENT DOCUMENTS

| | | |
|---|---|---|
| 6,647,260 B2 | 11/2003 | Dusse et al. |
| 7,394,893 B2 | 7/2008 | Brown et al. |
| 8,588,389 B2 | 11/2013 | Citron et al. |
| 8,867,726 B2 | 10/2014 | Cazanas et al. |
| 8,965,342 B1 | 2/2015 | Efrati et al. |
| 9,037,113 B2 | 5/2015 | Balasubramaniyan et al. |
| 9,060,057 B1 | 6/2015 | Danis |
| 9,332,119 B1 | 5/2016 | Danis |
| 10,027,816 B2 | 7/2018 | Gupta et al. |
| 2007/0217584 A1 | 9/2007 | Bi et al. |
| 2007/0264989 A1* | 11/2007 | Palakkal ............ H04L 29/06027 455/416 |
| 2011/0265153 A1 | 10/2011 | Guccione et al. |
| 2015/0230087 A1 | 8/2015 | Barkan |
| 2015/0230088 A1 | 8/2015 | Barkan |
| 2015/0230089 A1 | 8/2015 | Barkan |
| 2015/0230090 A1 | 8/2015 | Barkan |
| 2016/0212127 A1 | 7/2016 | Barkan |
| 2017/0325141 A1 | 11/2017 | Laliberte |
| 2018/0041638 A1 | 2/2018 | Gupta et al. |
| 2019/0030371 A1* | 1/2019 | Han ......................... G06T 7/11 |
| 2019/0325621 A1* | 10/2019 | Wang ..................... A61B 6/032 |
| 2019/0362522 A1* | 11/2019 | Han ..................... A61B 5/7267 |

OTHER PUBLICATIONS

"Phoneypot: Data-driven Understanding of Telephony Threats" by Payas Gupta et al., NDSS '15, Feb. 8-11, 2015, San Diego, CA, USA, Copyright 2015 Internet Society, ISBN 1-891562-38-X.
Notification of Transmittal of the International Preliminary Report on Patentability, dated Oct. 24, 2018, in corresponding International Application No. PCT/US2017/044866, 20 pages.

* cited by examiner

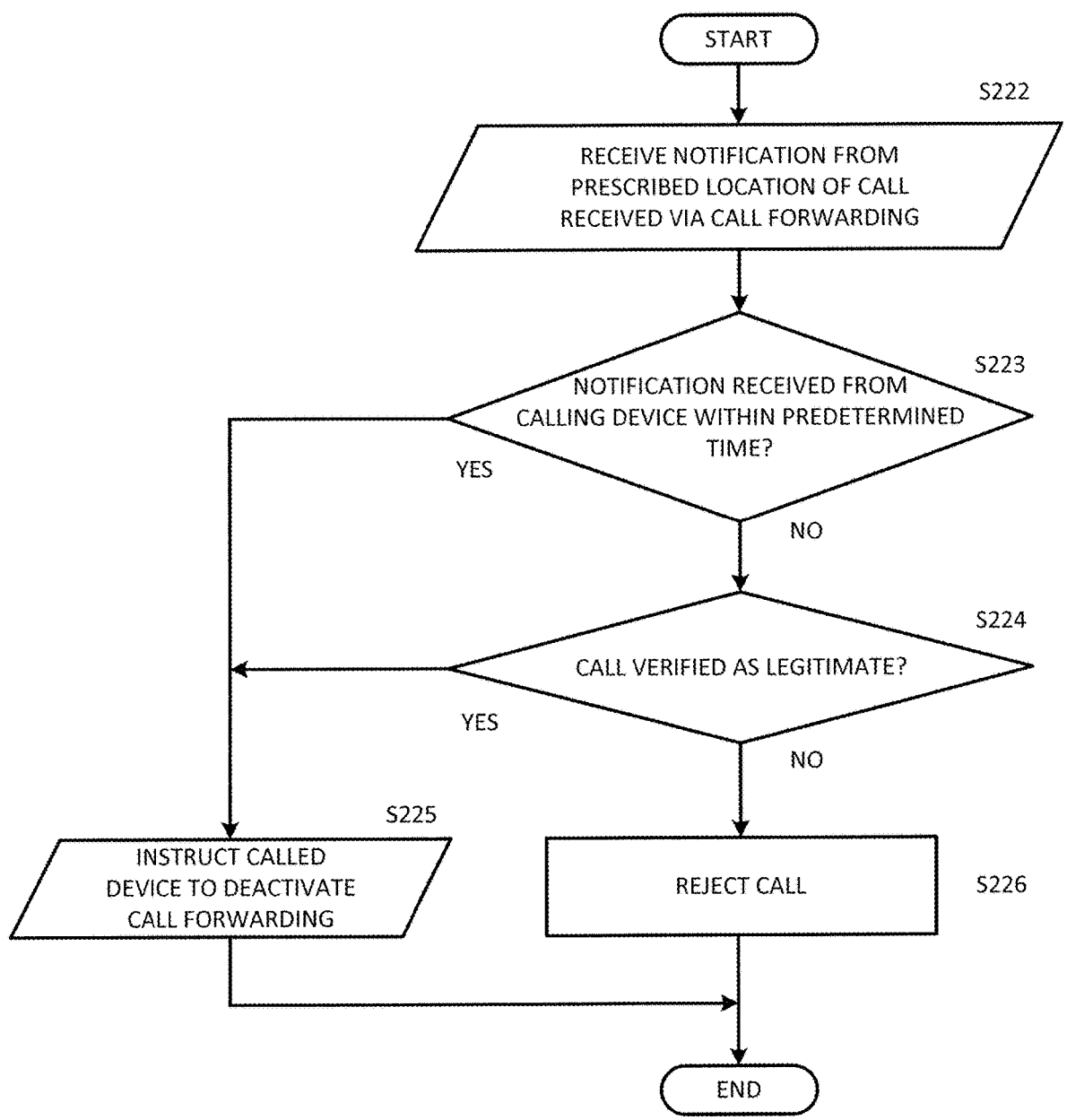

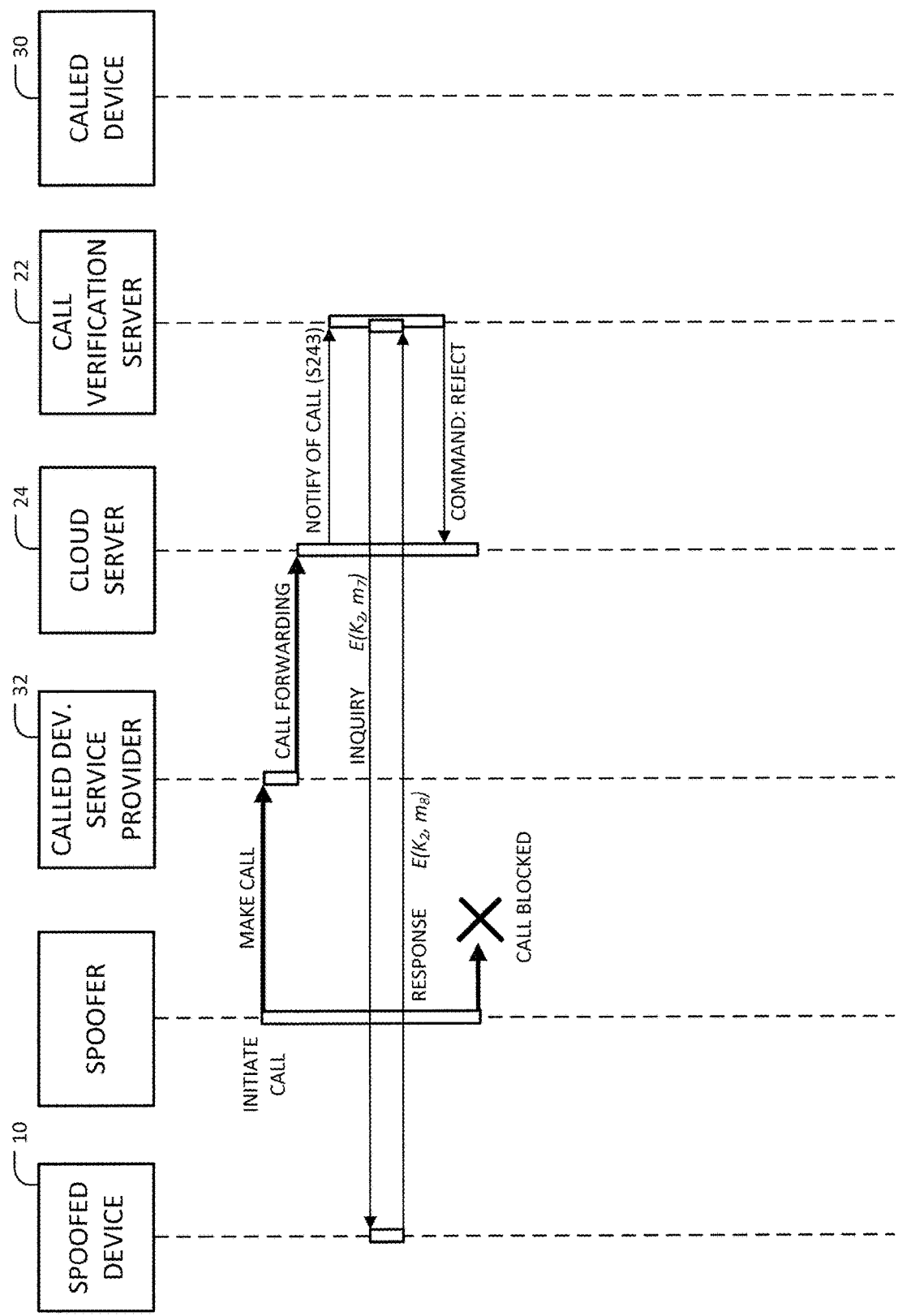

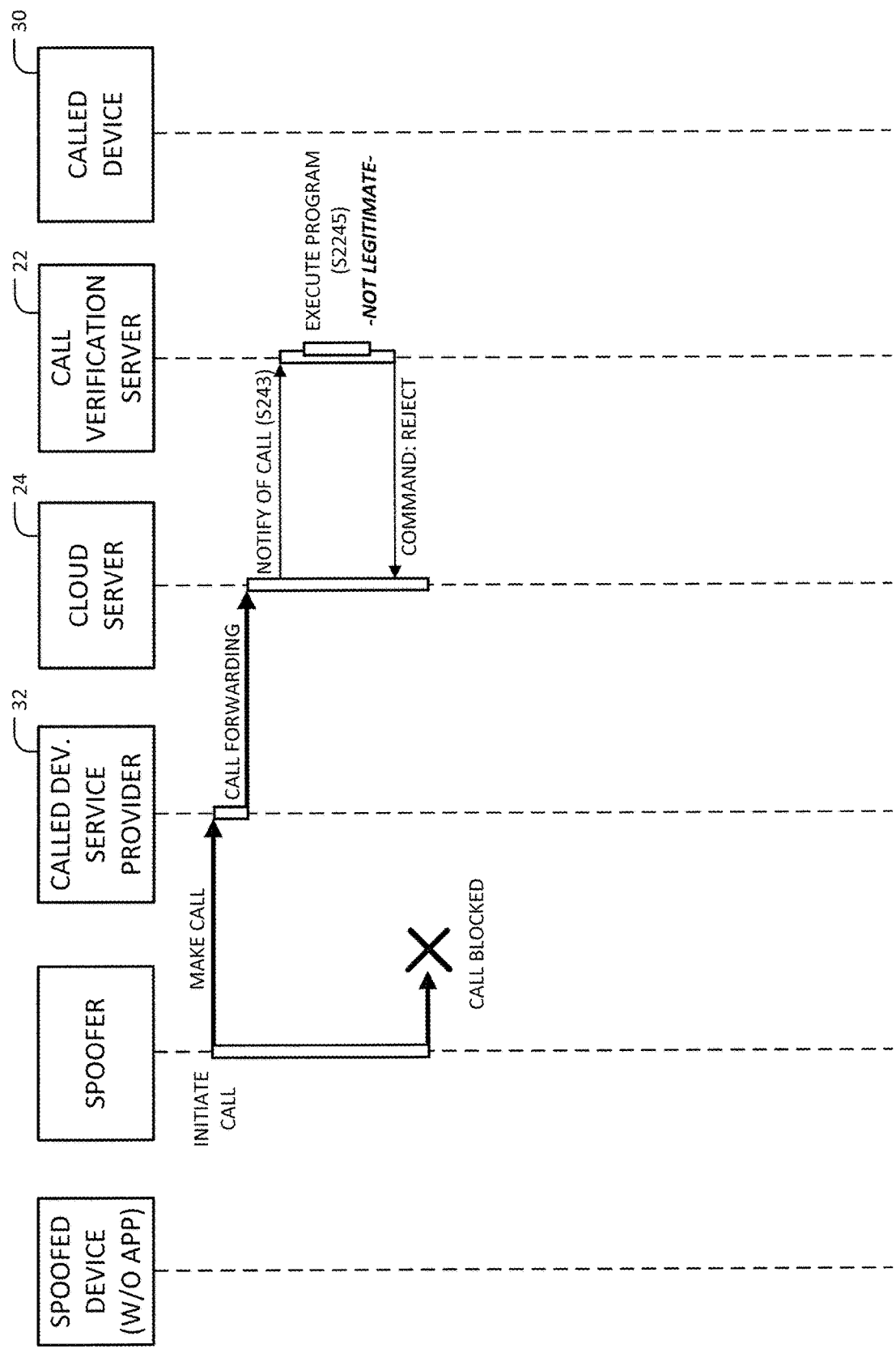

CALL AUTHENTICATION USING CALL FORWARDING

CROSS-REFERENCES TO RELATED APPLICATIONS

This application is a continuation of U.S. patent application Ser. No. 16/026,498, filed Jul. 3, 2018, which is a divisional of U.S. patent application Ser. No. 15/445,569, filed Feb. 28, 2017, which claims domestic priority under 35 U.S.C. § 119(e) to U.S. Provisional Patent Application No. 62/370,551 filed Aug. 3, 2016, each of which is incorporated by reference in its entirety.

FIELD OF THE INVENTION

The present invention is directed to a method and system for authenticating telephone calls made to a mobile device (e.g., smartphone) via call forwarding.

BACKGROUND OF THE INVENTION

Because of the increasing illegitimate use of phone calls, there is an urgent need to authenticate calls that come to one's telephone, as well as the callers making the calls. One type of such illegitimate activity includes illicit telemarketers making calls they are not authorized to make. To remedy this problem, caller ID blocking applications have been developed, which use caller ID to validate the entities making incoming calls. However, such applications are not effective when a caller spoofs another entity's telephone number, thus causing the recipient's caller ID to display a telephone number different from the actual originating phone number. In view of the spoofing problem, caller ID blocking applications may lead to a high number of false positives (e.g., a legitimate bank's number gets blocked when an attacker has been spoofing its phone number) as well as a high number of false negatives (e.g., spoofers' calls are not getting blocked, if they are spoofing numbers on a whitelist).

In view of the foregoing, there is a need to not only verify that the telephone number obtained through caller ID belongs to a safe entity, but also that the incoming call was in fact made by that entity.

SUMMARY OF THE INVENTION

A first exemplary embodiment of the present invention is directed to a method for verifying calls to a telephone device, which is assigned a telephone number, in which a processor executes an application or software to perform a process including activating call forwarding to redirect telephone calls for the telephone number to another prescribed destination; receiving a message from a prescribed server; in response to receiving the message, deactivating call forwarding to receive a telephone call for said telephone number authorized by a third party; and in response to determining that one of multiple concluding events has occurred in connection with the authorized telephone call, reactivating call forwarding.

For instance, the concluding events may include the telephone device hanging up on the authorized telephone call after the call was picked up, and the telephone call being terminated by the originating party before being picked up.

Furthermore, in connection with the first exemplary embodiment, the process may further comprise authenticating the received message and sending an acknowledgement of the received message to the prescribed server.

Furthermore, in connection with the first exemplary embodiment may further comprise sending status notifications to said prescribed destination in connection with said activation and reactivation of said call forwarding. As an example, such notifications could be sent via a cloud messaging service.

Furthermore, in connection with the first exemplary embodiment, the prescribed destination could comprise a prescribed server or a second server in communication with the prescribed server.

It is also contemplated that, in the first exemplary embodiment, the processor is included within the telephone device.

A second exemplary embodiment of the present invention is directed to a method, implemented on a telephone device, in which a processor executes an application or software to perform a process that includes: in response to a user of the telephone device initiating a telephone call to a second telephone device, determining whether the application or software is installed on the second telephone device; and if the application or software is installed on the second telephone device, transmitting a message to a prescribed server causing the prescribed server to instruct the second telephone device to deactivate call forwarding, which was previously activated to redirect telephone calls for the second telephone device to another prescribed location. For example, the process may also encrypt the message, and transmit it to the prescribed server via a cloud messaging service.

Furthermore, in connection with the second exemplary embodiment, the application or software may be configured, when executed, to respond to inquiries by the prescribed server as to whether the telephone device is currently placing a telephone call to a given telephone number.

Furthermore, in connection with the second exemplary embodiment, the processor executing the application or software may be included in the telephone device.

A third exemplary embodiment of the present invention is directed to a method implemented in a server, in which a processor in the server executes the following: receiving from a prescribed location, a message indicating that the prescribed location has received, by virtue of call forwarding, a telephone call made by a first telephone device to a particular telephone number assigned to a second telephone device, such call forwarding being activated by a particular application executing on the second telephone device; and in response to receiving said message, transmitting an instruction to the second telephone device to deactivate the call forwarding when one of the following conditions is satisfied: (1) the server has received a notification from the first telephone device of the telephone call by a predetermined time relative to receiving the message; and (2) the server has verified the telephone call as legitimate.

Furthermore, in connection with the third exemplary embodiment, the predefined location may, e.g., be a second server, and the message sent from this prescribed location may be sent from an automated script (e.g. a web application programming interface (API) script) running on the second server. Further, this second server may be part of a cloud communications platform.

Furthermore, in connection with the third exemplary embodiment, if the notification is not received by the server by the predetermined time, the processor further executes the following: extracting information from the message of an originating telephone number provided with the telephone call, and identifying a device according to the extracted information; and determining whether the particular application is installed on the identified device; if the particular application is installed on the identified device, transmitting a second message to the identified device via the particular application inquiring as to whether the identified device made the telephone call, with the call being verified as legitimate if an affirmative response to the second message is received from the identified device via the particular application. If, however, the particular application is not installed on the identified device, the processor may further execute a stored program analyzing whether the telephone call is legitimate, Furthermore, in connection with the third exemplary embodiment, if the processor determines that one of multiple concluding events has occurred in connection with the telephone call, the server may transmit a second instruction to the second telephone device to reactivate the call forwarding. Examples of such concluding events include the second telephone device hanging up after having picked up the telephone call, and the telephone call being terminated by the originating party before being picked up.

Furthermore, in connection with the third exemplary embodiment, the server may be configured to receive the notification from the first telephone device via a cloud messaging service.

BRIEF DESCRIPTION OF THE DRAWINGS

FIGS. 3A and 3B are flowcharts illustrating methods implemented in a call verification server, according to exemplary embodiments.

FIG. 4B is a sequential flow diagram illustrating a call flow when an attempt is made to spoof a telephone device equipped with the call verification application, according to an exemplary embodiment.

FIG. 5B is a sequence diagram illustrating a call flow when an attempt is made to spoof a telephone device that is not equipped with the corresponding application, according to an exemplary embodiment.

DETAILED DESCRIPTION

A more detailed description of the invention will now be provided in reference to the accompanying drawings.

Exemplary embodiments are directed to a system and method for verifying the legitimacy of a call, which is intended for a particular telephone device, through the use of call forwarding and a third party service provider.

The term "call forwarding" is a telephony feature for redirecting a telephone call to a different destination than the originally dialed telephone number. Particularly, call forwarding may redirect the call to a mobile telephone, a landline, a voicemail box, or any other device associated with a domestic telephone number.

Although there are special types of call forwarding for redirecting a call when a certain condition is met. Such types of call forwarding may be activated only when the line is busy, there is no answer, or when the call is from a select telephone number. However, as used herein below and in the accompanying claims, the term "call forwarding" refers to the type of call forwarding that forwards all incoming calls without any such condition.

Sometimes, telephone customers have to pay a nominal fee or a toll charge to forward their calls to another line, but there are also plans available in the United States that allow calls to be forwarded without fees. Either of these types of call forwarding may be used by exemplary embodiments of the present invention.

Using the call forwarding feature, according to principles of the present invention, the legitimacy of an incoming telephone call can be verified to a recipient telephone device. In this context, the term "verify" may be defined as determining whether the number indicated by caller ID is the true caller and/or whether the caller is authorized to make the call. To this end, exemplary embodiments of the present invention may utilize a key exchange technique to authenticate a caller to a recipient through a third party service provider.

"Key exchange" refers to any method in cryptography by which cryptographic keys are exchanged between two parties, allowing the use of a cryptographic algorithm. Using such a method, if two parties want to exchange encrypted messages with one another, both parties must be equipped to encrypt messages to be sent and decrypt messages received. There are various ways to encrypt a message. If the cipher is a symmetric key cipher, both will need a copy of the same key. If the cipher is an asymmetric key cipher with a public/private key property, both parties will need the other party's public key.

According to exemplary embodiments, a symmetric key cipher may be used to encrypt communications between various users and a third party, but the present invention is not limited thereto, i.e., asymmetric key cryptography may also be used between the third party and the users. For purposes of this specification, the use of symmetric key cipher will be assumed in connection with exemplary embodiments described below.

Figure 1A:
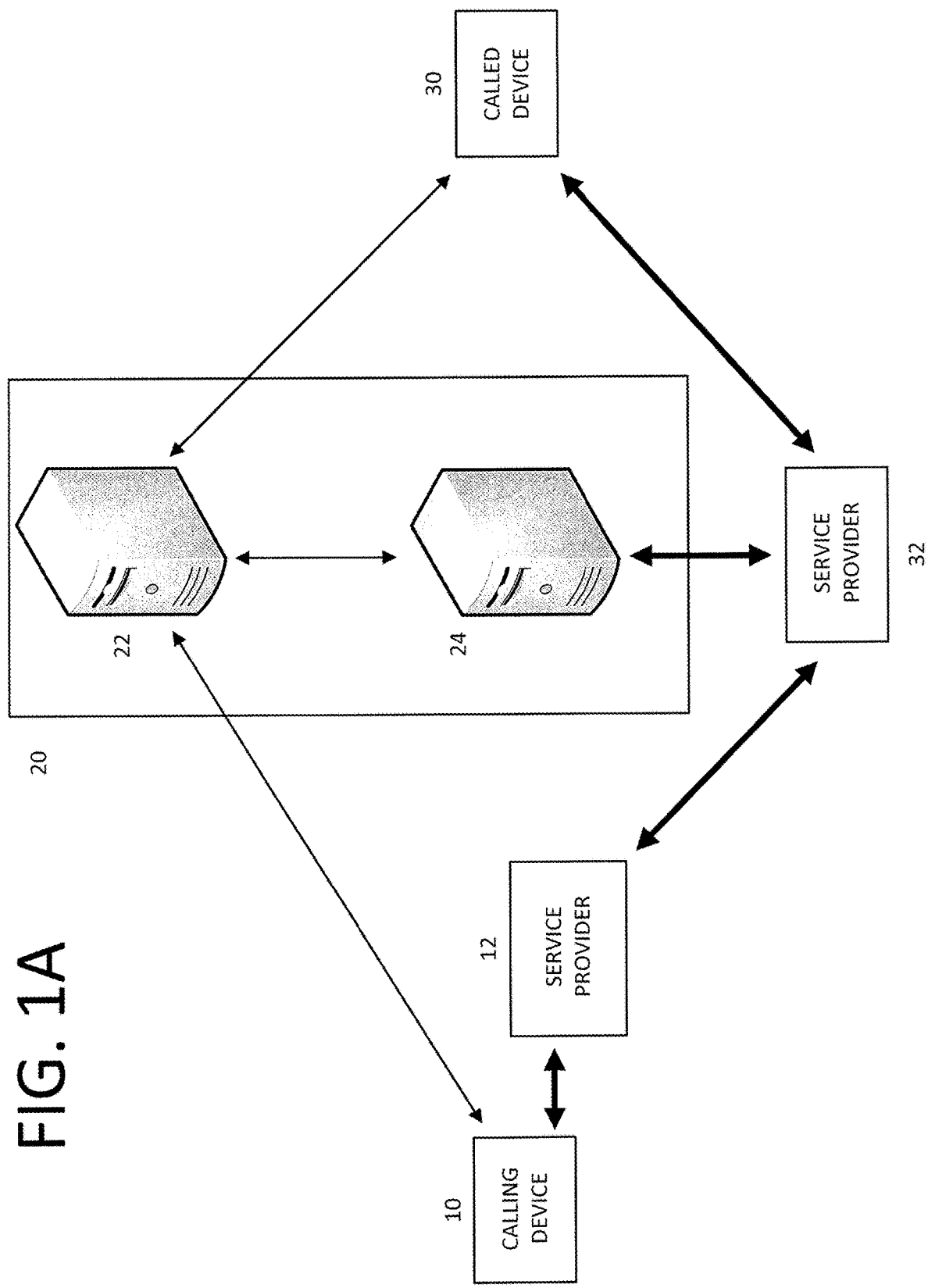
FIGS. 1A, 1B, 1C, 1D, and 1E are diagrams illustrating a system in which different types of telephone devices make a call to be verified, according to exemplary embodiments of the present invention.
Figure 1B:
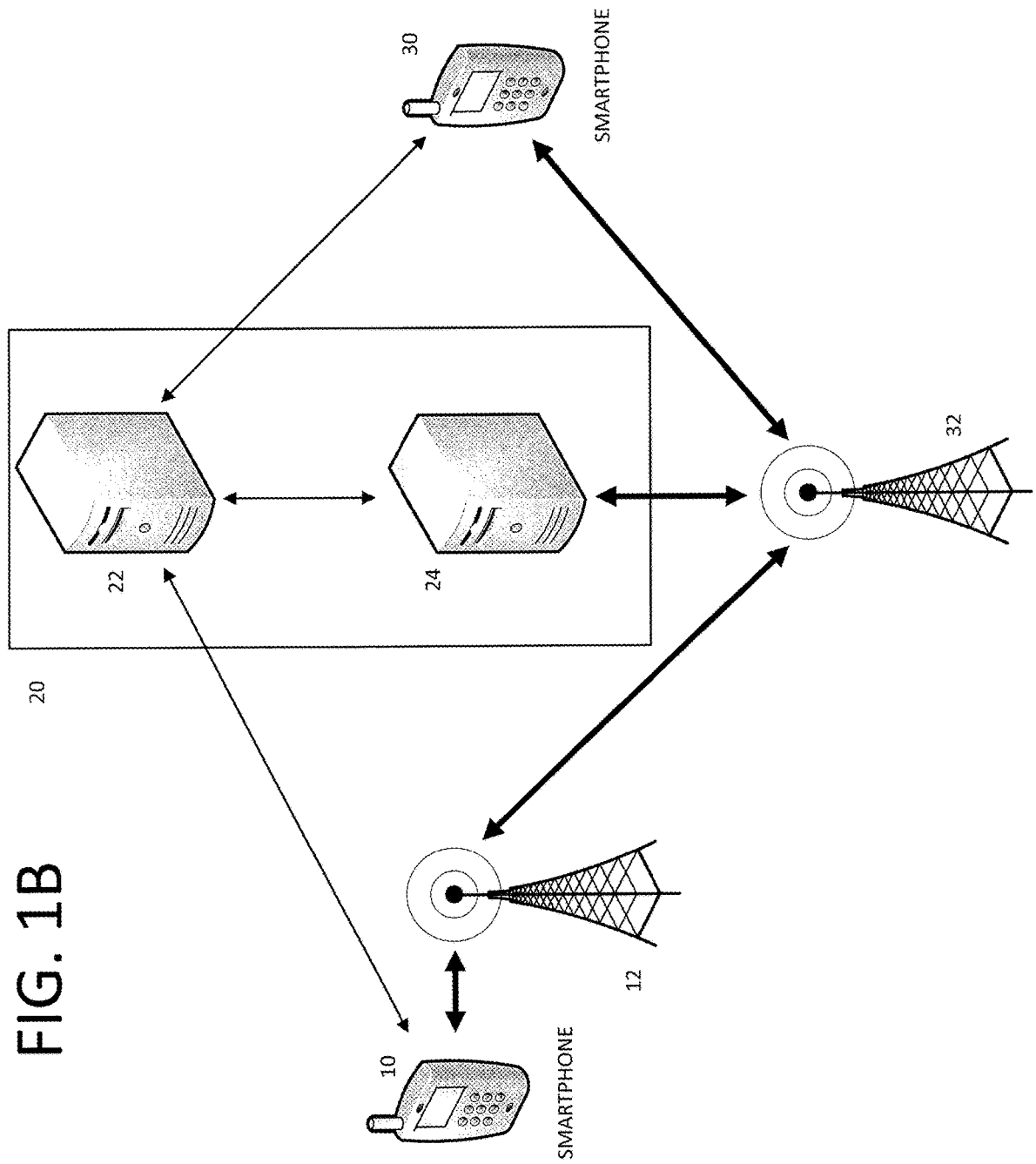
Figure 1C:
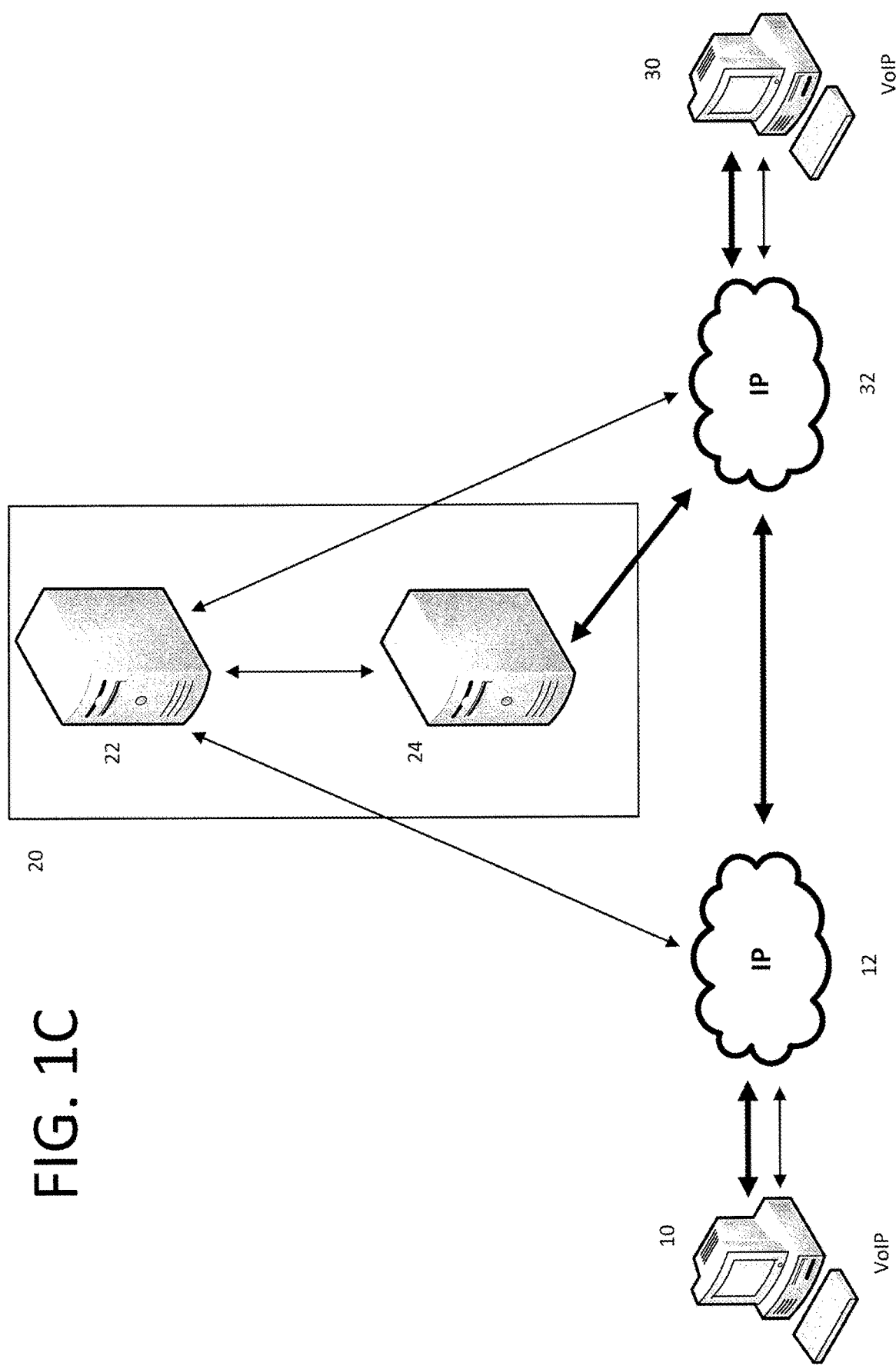
Figure 1D:
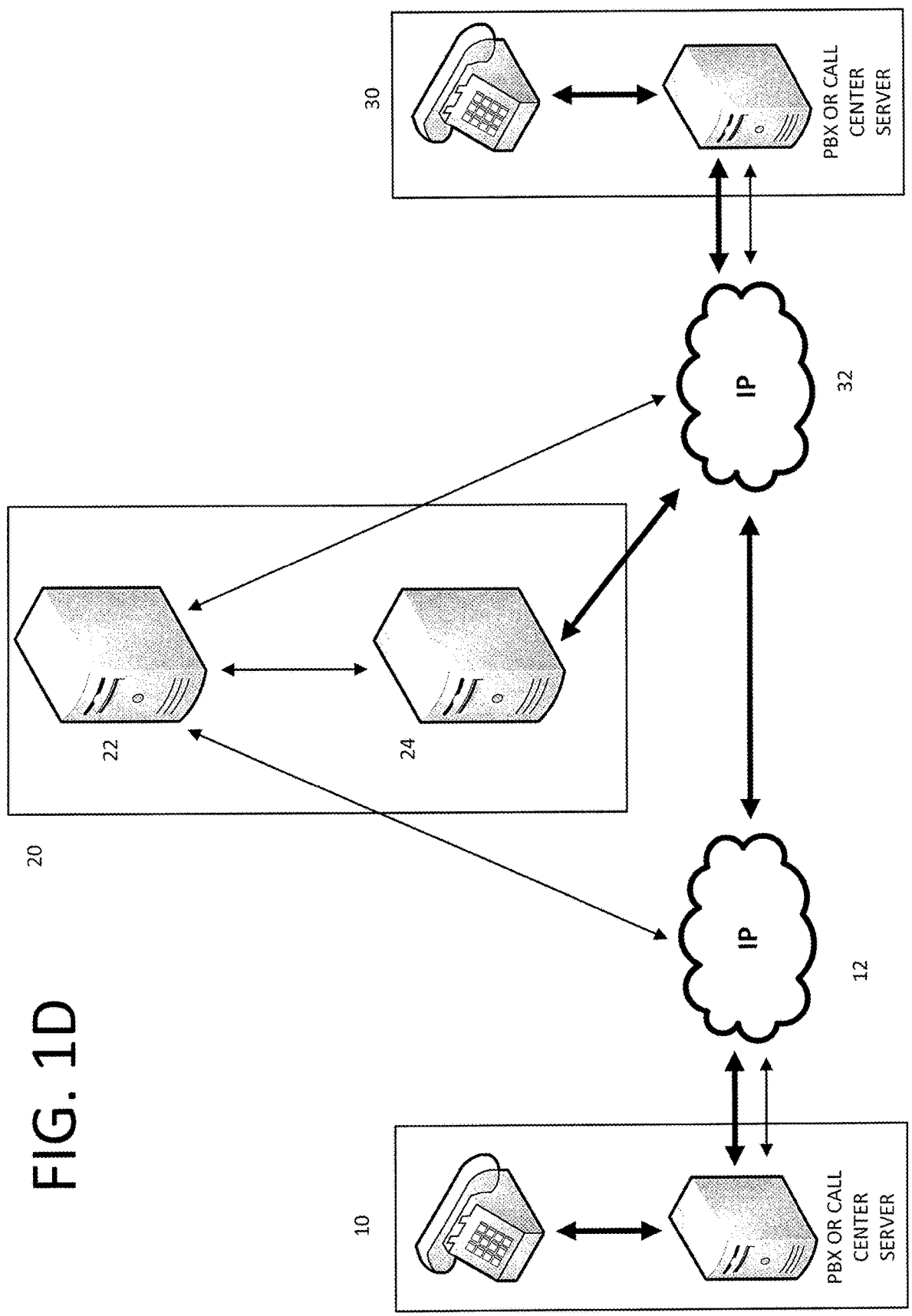
Figure 1E:
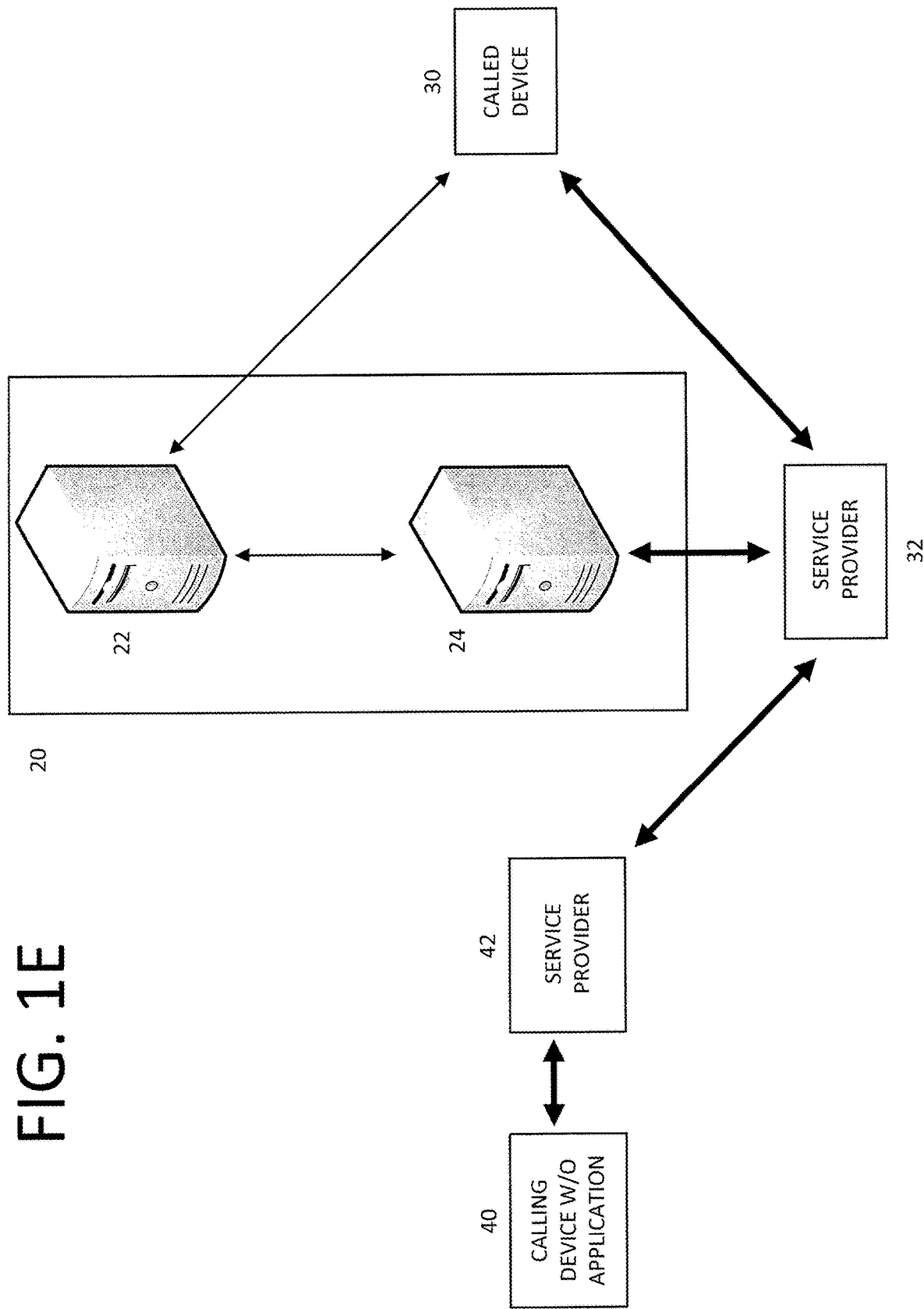

FIGS. 1A, 1B, 1C, 1D, and 1E are diagrams illustrating a system utilizing different types of calling devices according to exemplary embodiments of the present invention. In these figures, reference numeral 30 refers to a telephone device that is the intended recipient of a telephone call. According to an exemplary embodiment, this telephone device 30 is one configured to execute code, e.g., a software application or system. Examples of such a telephone device 30 include a smartphone (as shown in FIG. 1B) or a computer configured to conduct Voice over Internet Protocol (VoIP) calls (as shown in FIG. 1C). However, the telephone device 30 could alternatively comprise a combination of devices (as shown in FIGS. 1D and 1E). For instance, within a private branch exchange (PBX), the telephone device 30 may comprise the combination of a server (which executes software) and a conventional telephone. As another example, the telephone device 30 may include a server in a call center, coupled with a telephone that is serviced by the call center.

According to an exemplary embodiment, the telephone device 30 (sometimes referred to hereinafter as "called device," or the like) may be programmed or installed with a particular application (sometimes referred to hereinafter as "the call verification application," "the application," or the like) that allows the device 30 to operate in accordance with principles of the present invention. Such "application" may be embodied as a smartphone "app" or any type of code/application/system installed on a user device (e.g., personal computer) or server.

Further, the telephone device making the telephone call (sometimes referred to hereinafter as "calling device" or the like) may be configured to execute applications. For instance, the calling device may be a smartphone as shown in FIG. 1B, or a computer configured for VoIP (as shown FIG. 1C). Alternatively, the calling device 10 may comprise a server in a PBX or call center, coupled to a telephone (as shown in FIG. 1D). In such embodiments, the calling device may be programmed or installed with the same call verification application as the called device 30, but this is not a requirement. For instance, as shown in FIG. 1E, the calling device 40 is not equipped with the call verification application. This calling device 40 may simply be a conventional landline telephone, without the capability to execute applications (e.g., a "plain old telephone service" (POTS) telephone). Even in the case where the calling device has application-executing capability, the calling device is not required to be installed with the call verification application. Thus, the calling device 40 of FIG. 1E could possibly be a smartphone or VoIP device, which has not been installed with the call verification application. For purposes of this specification, the reference numeral 10 will be used in reference to a calling device, which has installed thereon the call verification application, while reference numeral 40 will be used in reference to a calling device, which is not equipped with such application.

It should be noted that, while FIGS. 1B, 1C, and 1D illustrate the called device 30 and the calling device 10 as being the same type of telephone devices, this is not required. For instance, if the called device 30 is a smartphone (as shown in FIG. 1B), the present invention may be able to verify calls originating from a calling device comprised of any one of a VoIP device (as shown in FIG. 1C), a telephone attached to a PBX or call center (as shown in FIG. 1D), or a conventional landline telephone (as shown in FIG. 1E).

Referring again to FIG. 1A, the calling device 10 and the called device 30 are illustrated as being serviced by respective service providers 12 and 32. Such service providers 12 and 32 are sometimes known as "telecommunications service providers" (TSPs). As such, this figure shows that the service provider 12 of the calling device 10 routes the call to the service provider 32 of the called device 30. Although devices 10 and 30 are shown in FIG. 1A as being serviced by different service providers 12 and 32, this need not be the case (i.e., a single service provider 32 may service both telephone devices).

For instance, in the example shown in FIG. 1B where both devices 10 and 30 are smartphones, the service providers 12 and 32 may be the respective cellular networks servicing the phones 10 and 30. In this case, when the call is made, the cellular network 12 of smartphone 10 may route the call to the cellular network 32 of smartphone 30.

On the other hand, in FIG. 1C, since both the calling device 10 and the called device 30 conducts calls using VoIP, an Internet Protocol (IP) network 14 such as the Internet is shown routing the calls from the calling device 10 to an IP network 32 of the called device 30. Further, in case the calling device 40 of FIG. 1E is a landline (e.g., POTS) phone, a public switched telephone network (PSTN) could be implemented as a service provider 42 routing the call to the called device's 30 service provider 32.

Furthermore, in the system of FIGS. 1A, 1B, 1C, 1D, and 1E, a third party service provider 20 is provided. According to an exemplary embodiment, the third party service provider 20 may comprise a call verification server 22 for servicing the call verification application, and another server 24 (sometimes referred to hereinafter as "cloud server") implemented on a cloud communications or telecommunications platform.

The call verification server 22 interacts with the call verification application installed on the called device 30 (and possibly the calling device 10) to verify whether a call is legitimate. The call verification server 22 may be maintained by the same business entity responsible for developing and distributing the call verification application, although this is not required. According to exemplary embodiments of the present invention, the call verification server 22 interacts with the installed application via encrypted communications, using the key exchange technique. Accordingly, the necessary cryptographic key(s) may be provided to a telephone device (including the calling device 10 and the called device 30) at the time the call verification application is installed. For example, the Diffie Hellman key exchange protocol could be used to exchange the key(s) between the telephone device and the server 22 when the application is installed (although other exchange protocols may also be used).

The communications between the call verification server 22 and the telephone devices 10 and 30 may be conducted using a cloud messaging service, e.g., Google Cloud Platform™ or Apple® Push Notification Service (APNS), but this is not required. In FIGS. 1A, 1B, 1C, and 1D, these communications are illustrated using thinner bi-directional arrows. Since FIG. 1E illustrates an embodiment in which the calling device 40 is not equipped with the call verification application, only the called device 30 is shown connected to the call verification server 22 via one of the thinner bi-directional arrows.

The cloud server 24 may be implemented as part of a cloud communications or telecommunications platform, such as Tropo® or Twilio®. Even though the cloud server 24 and the call verification server 22 are illustrated as part of the same third party service provider 20, there is no requirement that these two servers be physically maintained at the same location. In fact, it is contemplated that the actual hardware of the cloud server 24 may be maintained at a different location, by a different business entity, than the call verification server 22 (although this need not be the case).

Cloud communication platforms are Internet-based voice and data communication platforms where telecommunications applications and the underlying infrastructure are hosted by a third-party organization, which can be accessed over the public Internet. The cloud server 24 may be configured as a destination for telephone calls re-directed by call forwarding. This is illustrated in FIGS. 1A, 1B, 1C, 1D, and 1E by the thicker bi-directional arrows connecting the cloud server 24 to the service provider 32 of the called device 30. However, the cloud server 24 may also execute an automated script (e.g., a web API script) to exchange messages with (and respond to commands from) the call verification server 22. Such communications between the cloud server 24 and the call verification server 22 are illustrated in each of FIGS. 1A, 1B, 1C, 1D, and 1E by a thinner bi-directional arrow.

It should be noted that, in FIGS. 1A, 1B, 1C, 1D, and 1E the thicker bi-directional arrows are intended to illustrate the flow of the telephone call, while the thinner bi-directional arrows are intended to illustrate other communications (messages, commands, etc.). A more detailed description of the operation of the various components in these figures, according to exemplary embodiments of the present invention, will be provided below in connection with the flowcharts (FIGS. 2A-2C and FIGS. 3A-3C) and sequential flow diagrams (FIGS. 4A, 4B, 5A, and 5B).

First, an exemplary embodiment of the present invention will be discussed from the point of view of the called device 30. This discussion will make reference to FIG. 2A, which is a flowchart illustrating a method 300 performed by the called device 30 under the direction of the call verification application.

According to operation S310, the called device 30 activates call forwarding to redirect its calls to a prescribed location (e.g., cloud server 24). This step may be performed once the application starts executing on the device 30, e.g., by communicating with its service provider 32 using an appropriate Unstructured Supplementary Service Data (USSD) code. As a result, when a party (using calling device 10 or 40) calls the telephone number assigned to the called device 30, the call will automatically be redirected by the device's 30 service provider 32 to a location (or phone number) prescribed by the aforementioned USSD code.

Next, the application waits to hear from the call verification server 22 regarding an incoming call. When an incoming call is authorized by the call verification server 22 (i.e., the server 22 verifies the incoming call is legitimate), the device 30 receives a message from the server 22 according to S320. For example, this message (as well as other messages exchanged between the called device 30/calling device 10 and the server 22) may be encrypted. However, it is not required that these communications be encrypted. Therefore, while the use of encryption, as well as other particulars about messaging (e.g., number of messages, use of acknowledgements, etc.), is described in this specification in regard to the accompanying flowcharts and sequences diagrams, such description is merely provided as an example, and is not intended to be limiting on the claims.

Referring again to S320 of FIG. 2A, assuming that encryption is used and that the corresponding cipher is a symmetric key cipher (in which the same cryptographic key $K_1$ is provided to both the called device 30 and the call verification server 22), the message received from the server 22 may be represented as $E(K_1, m_1)$, with E representing the cryptographic function and m1 representing the unencrypted message. Particularly, when the incoming call is verified as legitimate, the call verification server 22 formulates the message $m_1$ to instruct the called device 30 to deactivate or disable call forwarding. In response, the application on the called device 30 may respond with a message to the server 22 which acknowledges receipt of the instruction (and/or that call forwarding has been disabled). For instance, this response may be an encrypted message $E(K_1, m_2)$ where $m_2$ represents the underlying message acknowledging receipt of the instruction and/or disablement of call forwarding.

The message of S320 (and acknowledgement thereto) may be exchanged between the server 22 and device 30 via a cloud messaging service. However, the use of a cloud messaging service is not required. Furthermore, it is also possible (but not required) to include a random number in each transmitted message, which is to be included in any acknowledgement message sent in response thereto. The inclusion of such random numbers can help protect against replay attacks by malicious parties.

Figure 2A:
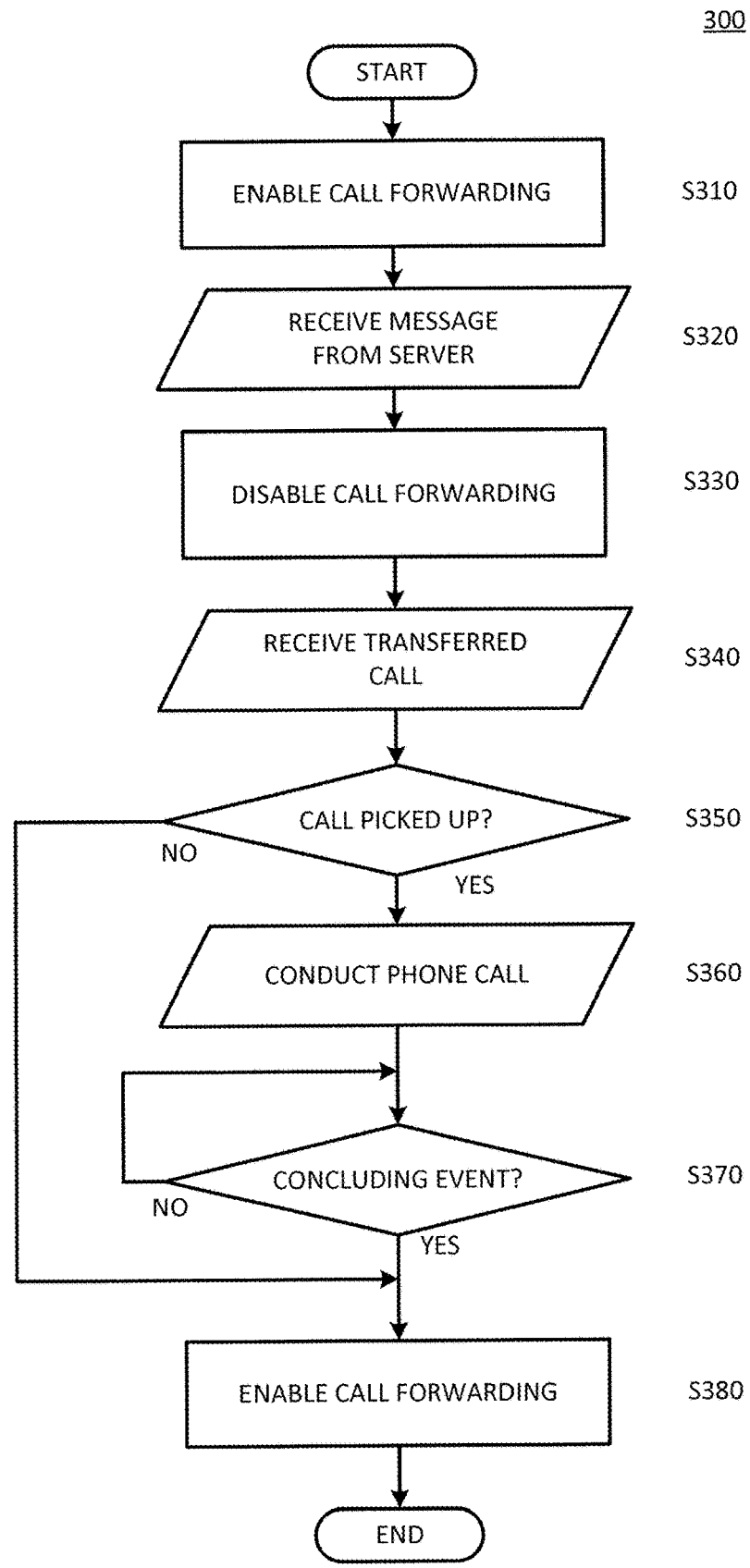
FIG. 2A is a flowchart illustrating a method implemented in a telephone device receiving the call to be verified, according to an exemplary embodiment of the present invention.

In operation S330 of FIG. 2A, the application causes the called device 30 to deactivate or disable (temporarily) call forwarding, in response to the message received according to S320. For instance, the called device 30 transmits an appropriate USSD to instruct its service provider 32 to stop redirecting the device's 30 incoming calls to the prescribed location, e.g., cloud server 24. This allows the call, which has been authorized (verified as legitimate) by the call verification server 22, to be transferred from the prescribed location (e.g., cloud server 24) to the called device 30 according to S340.

Once the verified call is transferred to the called device 30, the call is either answered or left unanswered according to S350 of FIG. 2A. If the call is left unanswered in S350 ("NO"), the application causes the called device 30 to reactivate or enable call forwarding in operation S380 so that incoming calls will be redirected to the prescribed location, e.g., cloud API server 24.

On the other hand, if the call is picked up or answered at S350 ("YES"), the device 30 conducts the call with the calling device (S360) until the call is terminated by a concluding event (S370). Examples of such concluding events are the called device 30 hanging up on the call, the calling device hanging up on the call, or possibly that a cellular network drops the call. Upon termination of the call, the call verification application on device 30 reactivates call forwarding in operation S380.

Furthermore, upon enabling call forwarding again in S380, the application may cause the called device 30 to send another message, e.g., an encrypted message $E(K_1, m_3)$, to the call verification server 22 to notify the server 22 that call forwarding is enabled. In response, the server 22 could send an acknowledgement, e.g., an encrypted acknowledgement $E(K_1, m_4)$, back to the device 30. As indicated earlier, such encrypted message $E(K_1, m_3)$ may optionally include another random number that is to be included in the acknowledgement $E(K_1, m_4)$.

Next, exemplary embodiments of the invention, from the point of view of the calling device will now be discussed in connection with FIGS. 2B and 2C.

Figure 2B:
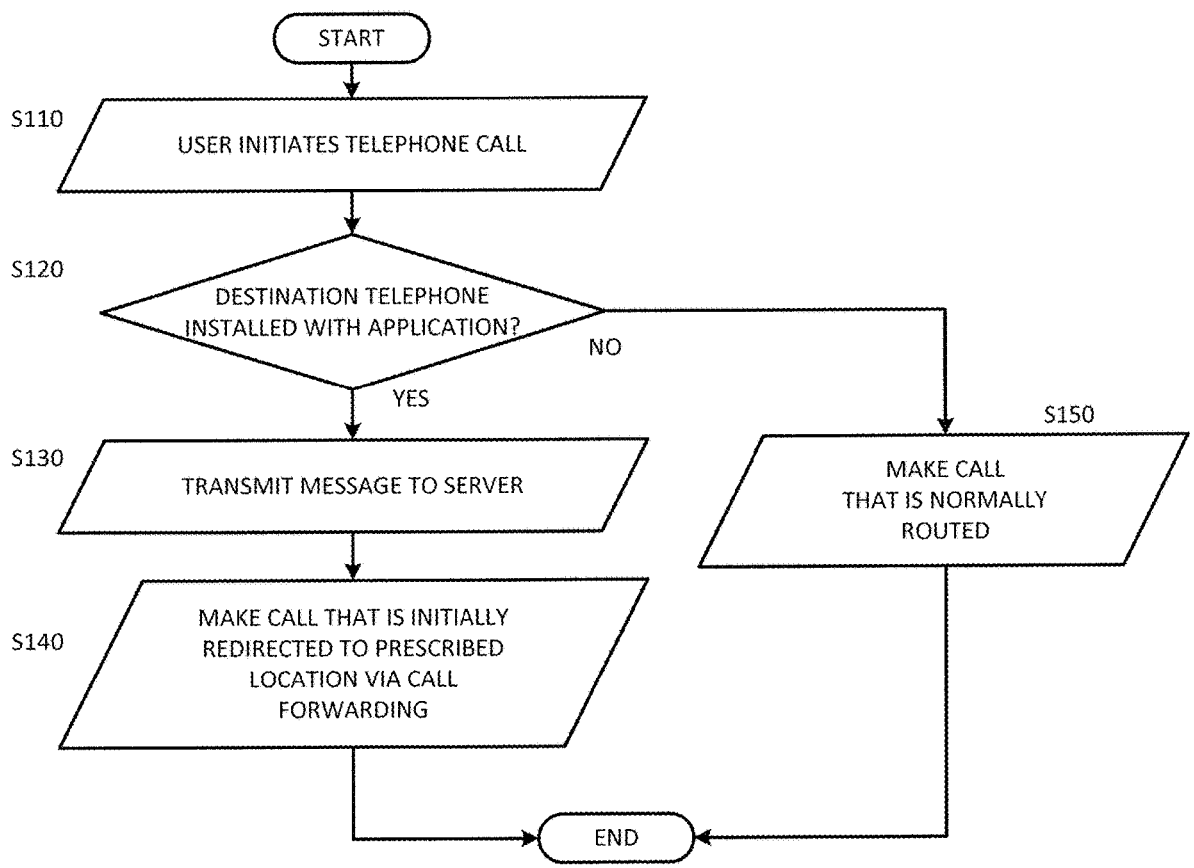
FIGS. 2B and 2C are flowcharts illustrating respective methods implemented in a telephone device making the call to be verified, according to exemplary embodiments of the present invention.

FIG. 2B is a flowchart illustrating a method implemented in a calling device 10, operating under the direction of the call verification application, for making a phone call to the called device 30 according to an exemplary embodiment. In this figure, it is assumed that the application is already executing on the calling device 10 at the start of the method.

The call is initiated by a user in S110, e.g., by dialing a telephone number of the intended destination, pressing a speed dial button associated with the destination telephone number, clicking a hyperlink associated with the number, choosing the destination from a predefined or stored "Contacts" list, etc.

In response to imitation of the call, the application checks whether the intended destination of the call is a telephone device 30 equipped with the call verification application (operation S120). To do this, for example, the application may cause the calling device 10 to transmit an encrypted message to the call verification server 22, inquiring as to whether the device associated with the destination telephone number is equipped with the application. Alternatively, the application may store within the calling device 10 a list of devices equipped with the application, such list being updated periodically by the server 22.

If the intended destination of the call is not equipped with the application ("NO" in S120), the call may be routed in a conventional manner as shown in S150 of FIG. 2B.

On the other hand, if the application decides that the intended destination is a device 30 equipped with the application ("YES" in S120), the application causes the calling device 10 to transmit a message, e.g., an encrypted message, to the call verification server 22 in operation S130 to notify the server 22 about the call. Assuming again that a symmetric key cipher is used, both the device 10 and the server 22 may be provided a common cryptographic key K2, and the encrypted message of S130 may be represented as $E(K_2, m_5)$, with $m_5$ representing the unencrypted notification. The call verification server 22 may acknowledge the notification by sending back an encrypted message $E(K_2, m_6)$ to the calling device 10, with $m_6$ representing the acknowledgement message. As discussed earlier, a random number may be included in these messages $E(K_2, m_5)$ and $E(K_2, m_6)$ as a security measure.

After the call verification server 22 has been notified, in accordance with S140 of FIG. 2B, the call is transferred from the calling device's 10 cellular service provider 12 (or the IP network 14) to the called device's 30 cellular service provider 32, redirected to a prescribed location (e.g., cloud server 24) via call forwarding, and ultimately transferred to the called device 30 once it is authorized by the call verification server 22.

As described above, the calling device 10 is able to determine, in operation S120, whether the intended destination is also equipped with the call verification application and, thus, whether the call verification server 22 should be notified of the call in S130. However, there could be situations in which the application executing on the calling device 10 cannot make a correct determination as to whether the intended destination is also equipped with the application. This may occur in situations, for example, where the calling device 10 has not been updated with the most recent list of telephone devices equipped with the call verification application, Internet connectivity has been lost, the application is not working, etc. To deal with these situations, in another exemplary embodiment, the application may be configured to allow the calling device 10 to respond to inquiries by the call verification server 22 as to whether the device 10 is attempting to call another device 30 without notifying the server 22. The flowchart of FIG. 2C illustrates a supplementary method 100' that can be implemented in the calling device 10 in accordance with this embodiment.

Figure 2C:
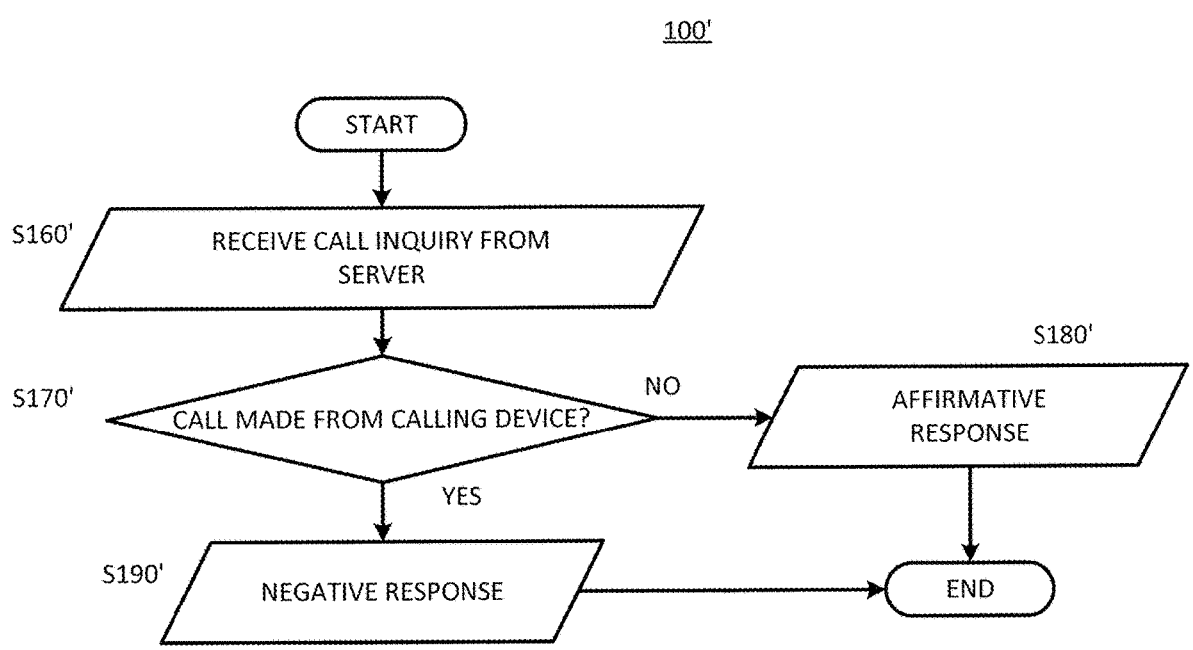

In this supplementary method 100' of FIG. 2C, the calling device 10 receives an inquiry from the call verification server 22 according to S160'. The inquiry may be received, e.g. as an encrypted message $E(K_2, m_7)$, where the underlying message $m_7$ prompts the device 10 to confirm whether or not it is currently attempting a call to a designated telephone device, i.e., called device 30. According to operation S170', the application on the device 10 decides whether or not the call is being made. In response to this decision, the application causes the device 10 to send to the server 22 either an affirmative response according to S180' (confirming that the device 10 is attempting the call), or a negative response according to S190' (indicating that the device 10 is making no such call). This response may be sent, e.g., as an encrypted message $E(K_2, m_8)$, where the message $m_8$ represents an affirmative or negative response to the inquiry. By configuring the device 10 to respond to such inquiries (via the application), the call verification server 22 may be provided with another tool for verifying the legitimacy of phone calls directed toward a called device 30.

It should be noted that the use of numeric labels in connection with the aforementioned messages (e.g., m1, m2, etc.) is not intended to indicate the sequence or order in which such messages are sent. As will be discussed below in connection with FIG. 4A, for example, it is contemplated that the calling device 10 and call verification server 22 may exchange messages $m_5$ and $m_6$ before messages m1 and $m_2$ are exchanged between the server 22 and called device 30. Therefore, the numeric labels should not be interpreted as imposing any particular sequence to the issuance of such messages.

Now, exemplary embodiments of the present invention as implemented in a third party service provider 20 will be described.

Figure 3B:
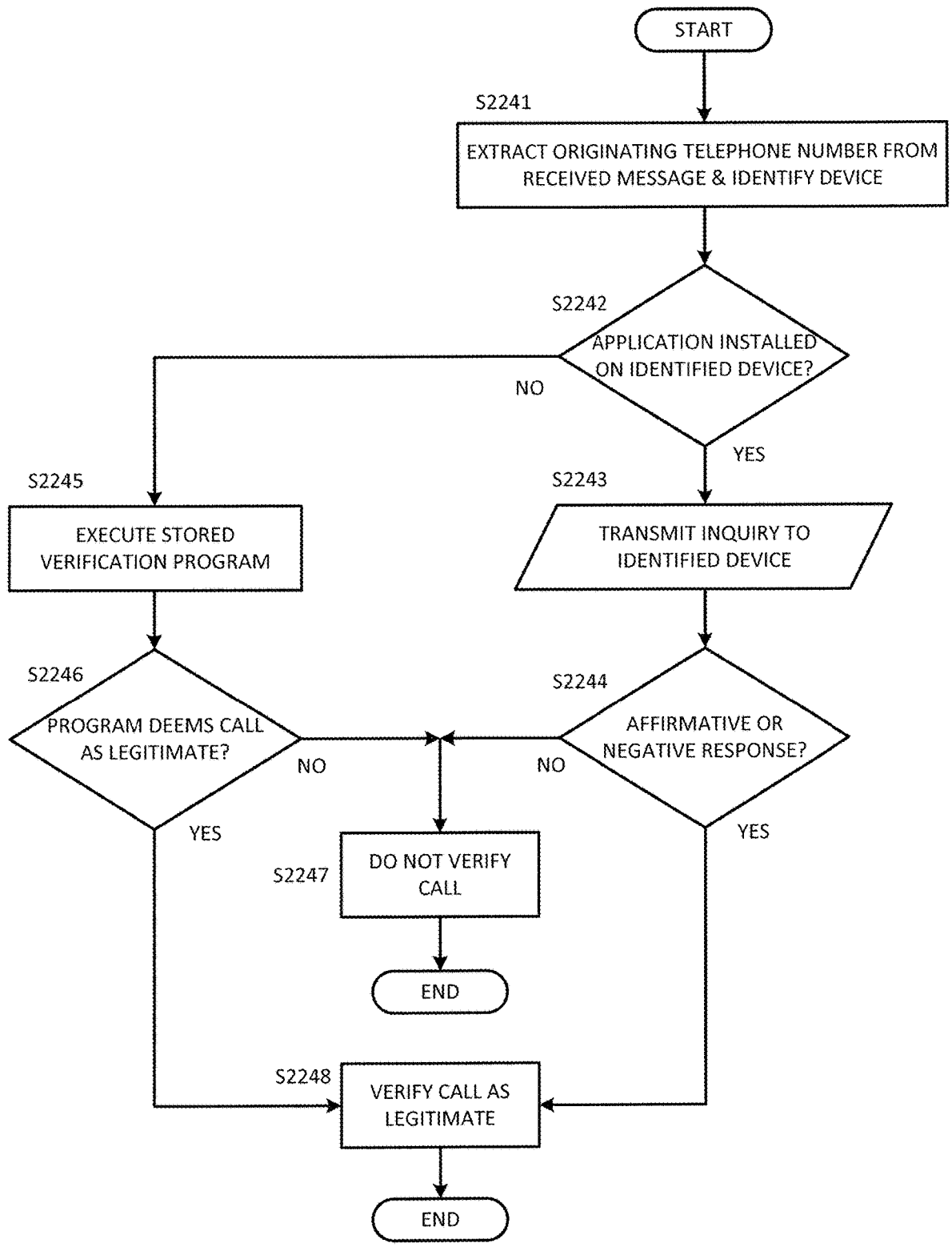

FIGS. 3A and 3B are flowcharts illustrating methods implemented in a call verification server 22 according to exemplary embodiments. Particularly, FIG. 3A illustrates a base method 220 implemented in the server 22 according to an exemplary embodiment, while FIG. 3B illustrates an example method 2240 whereby the server 22 can decide whether to verify a call as legitimate.

First, the method 220 of FIG. 3A will be described. According to S222, the call verification server 22 receives a message from a prescribed location (e.g., cloud server 24) to which calls are redirected by virtue of call forwarding enabled by the called device 30 (e.g., according to S310 or S380 of FIG. 2A). The received message indicates that the prescribed location (e.g., cloud server 24) has received a telephone call for the called device 30 via call forwarding.

In operation S223, the server 22 decides whether it has received a notification of the telephone call from a calling device 10 within a predetermined time relative to receiving the message of S222 from the prescribed location (e.g., cloud server 24). This notification may correspond to a message, e.g., an encrypted message $E(K_2, m_5)$, transmitted by the calling device 10 (e.g., via cloud messaging) according to S130 of FIG. 2B. Further, the aforementioned "predetermined time" represents the amount of time it should take the notification to be received from the calling device 10, if the calling device 10 did in fact make the call, given various factors (e.g., related to performance of the call verification application, cellular networks, cloud messaging system). For instance, according to an exemplary embodiment, the call verification server 22 may expect to receive the notification from the calling device 10 before receiving the corresponding notification from the prescribed location (e.g., cloud server 24) according to S222.

If operation S223 decides that the notification was received from the calling device 10 by the predetermined amount of time ("YES"), this may be sufficient for the call verification server 22 to verify the telephone call as legitimate in the embodiment of FIG. 3A. As a result, the server 22 may instruct the called device 30 to disable or deactivate call forwarding in operation S225. For example, this instruction may be transmitted by the server 22 via a cloud messaging service, and may also be transmitted in the form of the encrypted message $E(K_1, m_1)$ discussed above in connection with S320 of FIG. 2A. When the call verification server 22 performs operation S225, the server 22 in effect authorizes the call. As such, in addition to S225, the call verification server 22 may also command the prescribed location to transfer the call to the called device 30. For instance, assuming that the prescribed location is a cloud server 24, the call verification server 22 may transmit an instruction to an automated script (e.g., a web API script) running on the server 24 to transfer the call to the called device 30.

On the other hand, if it is decided in S223 that the call verification server 22 did not receive timely notification of the call from a calling device 10, the server 22 may perform another operation S224 to decide whether or not the call can be verified as legitimate. Such an operation may be necessary when a telephone device 40 not equipped with the call verification application is making the call. The server 22, for example, may perform operation S224 according to method 2240 of FIG. 3B, which will be described in detail below.

Referring again to FIG. 3A, if the call is verified as legitimate ("YES" in S224), the server 22 proceeds to instruct the called device 30 to deactivate call forwarding according to S225. In other words, in S225 the server 22 effectively authorizes the call to be forwarded to the called device 30. If, on the other hand, the server 22 is unable to verify the legitimacy of the call in S224, the call is rejected in operation S226. According to S226, the call verification server 22 may instruct the prescribed location to reject the call (e.g., by sending a "reject" or "drop" command to the cloud server 24).

As indicated above, FIG. 3B is a flowchart illustrating a method 2240 implemented in the call verification server 22 for verifying the legitimacy of a call, according to an exemplary embodiment, in furtherance of operation S224 of FIG. 3A.

According to operation S2241 of FIG. 3B, the call verification server 22 processes the message from the prescribed location (e.g., cloud server 24) and extracts therefrom information of an originating telephone number of the telephone call. This telephone number may be obtained using caller ID technology. According to S2241, the sever 22 also identifies a telephone device to which the originating phone number has been assigned, using known techniques. In operation S2242, the call verification server 22 then determines whether the call verification application is installed and/or executing on the identified device (and, thus, whether such device has exchanged encryption keys with the server 22). This determination may be performed, e.g., by looking up a database or registry of devices that have installed the application.

If the server 22 decides that the identified device is a calling device 10 equipped with the call verification application ("YES" in S2242), the server 22 transmits an inquiry to the called device 10 in operation S2243. This inquiry may be transmitted, e.g., via a cloud messaging service, as the message, e.g., encrypted message E($K_2$, $m_6$), mentioned above in connection with S160' of FIG. 2C. In operation S2244 of FIG. 3B, the server 22 determines whether a response transmitted by the calling device 10 is affirmative (the calling device 10 confirms it is making the call, which is still in progress, to the called device 30) or negative (the calling device 10 denies making the call, or the call has been terminated). For purposes of the invention, a lack of a response from the calling device 10 within a designated time may be treated as a negative response according to S2244, or alternatively as though the application is not installed on the device ("NO" in S2242). When an affirmative response is received from the calling device 10 ("YES" in S2244), the server 22 may verify that the call is legitimate according to S2248. On the other hand, if the response from the calling device 10 is negative (or, perhaps, when no response is received within a designated time), the server 22 cannot verify the legitimacy of the call according to S2247.

Referring again to operation S2242 of FIG. 3B, if the device identified in association with the originating telephone number is not equipped with the application ("NO"), the call verification server 22 may employ an alternative technique for verifying the legitimacy of the incoming call. For instance, in operation S2245, the server 22 may execute a computer program employing one or more of various technologies developed for verifying whether an incoming call is legitimate. Such technologies may include the use of blacklists or whitelists, as well as computing algorithms for detecting whether a call was originated by a spoofer or another type of malicious or illegitimate caller. One example of an applicable technology is described in U.S. Pat. No. 9,037,113B2, entitled "Systems and Methods for Detecting Call Provenance from Call Audio," issued on May 19, 2015 to Vijay Balasubramaniyan et al., the contents of which is incorporated herein by reference. Another example of such technology is known as a "honeypot" or "telephony honeypot," a specific example of which is described in the publication "Phoneypot: Data-driven Understanding of Telephony Threats" by Payas Gupta et al., NDSS '15, 8-11 February 2015, San Diego, Calif., USA, Copyright 2015 Internet Society, ISBN 1891562-38-X, the contents of which is incorporated herein by reference.

If the executed program decides that the call is legitimate, resulting in a "YES" decision in S2246, the server 22 proceeds to authorize the call, i.e., verify the call as legitimate, in S2248. On the other hand, if the program decides that the call is not legitimate, i.e., originating from a spoofer or other malicious caller or the like, the server 22 does not verify the call according to S2247.

Figure 3C:
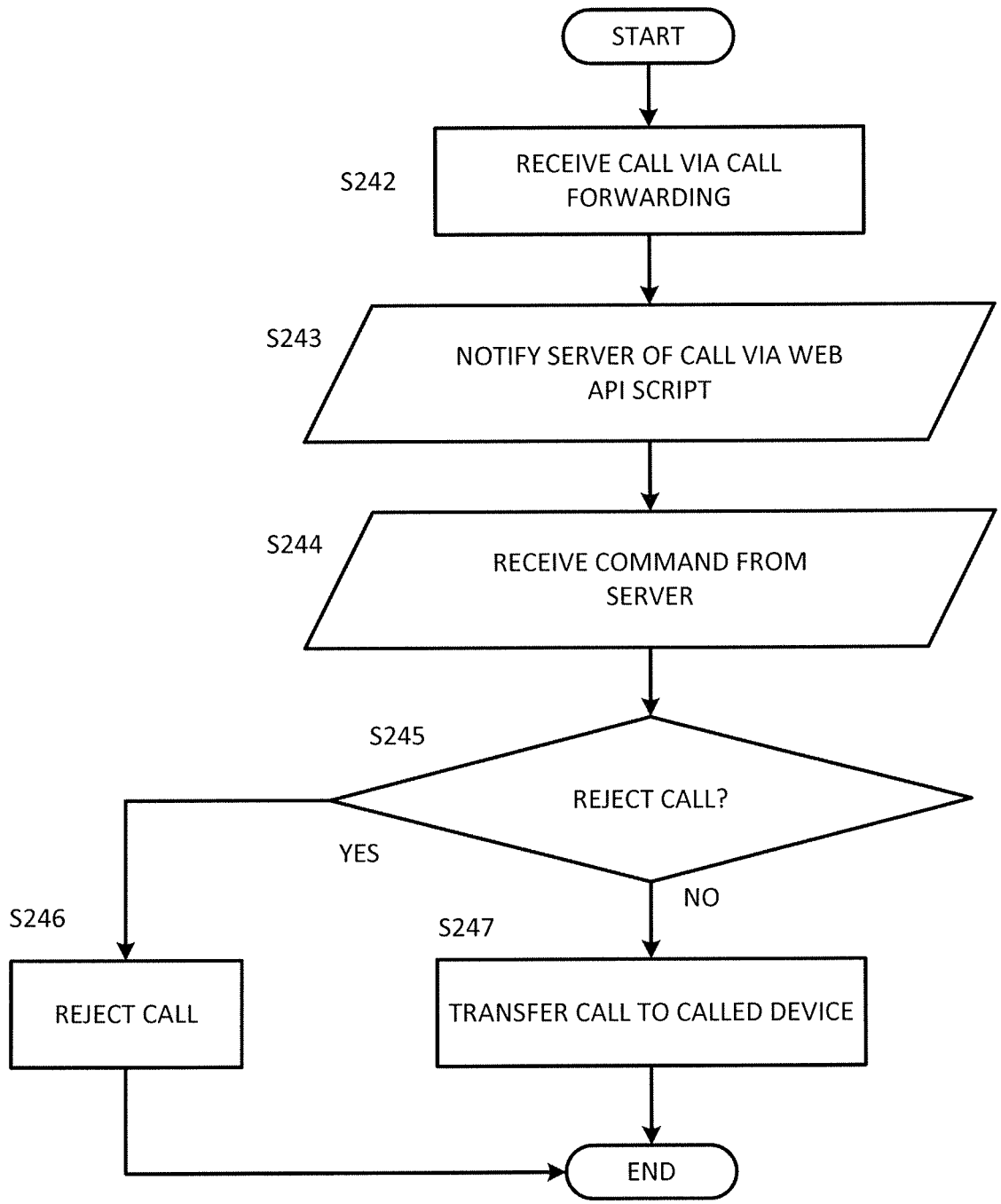
FIG. 3C is a flowchart illustrating a method implemented by a server in a cloud communications or telecommunications platform, according to an exemplary embodiment.

FIG. 3C is a flowchart illustrating a method 240 implemented by the cloud server 24, when implemented as the aforementioned "prescribed location," according to an exemplary embodiment of the present invention.

In S242, the cloud server 24 receives a telephone call for a called device 30 via call forwarding enabled by such device 30. In response, the cloud server 24 transmits a message to the call verification server 22 in operation S243. For example, in S243, an automated script (e.g., a web API script) running on the cloud server 24 may notify the call verification server 22 that a call for the called device 30 has been made (and held at the cloud server 24).

According to S244, the automated script on the cloud server 24, receives a command from the call verification server 22 as to what should be done with the call. If the received command is to reject the call ("YES" in S245), the automated script takes an appropriate action. This may include, in addition to dropping the call, providing appropriate notification to the call's originator.

On the other hand, if the automated script on the cloud server 24 receives a command from the call verification server 22 not to reject the call (but instead allow the call to proceed to the called device 30 ("NO" in S245), this means that the call verification server 22 has authorized the call and instructed the called device 30 to disable call forwarding (see S225 of FIG. 3A). Thus, in operation S247, the cloud server 24 transfers the telephone call to the called device 30 for which the call is intended.

Next, a description will be provided of how exemplary embodiments of the present invention may operate under various scenarios, with reference to the sequential flow diagrams of FIGS. 4A, 4B, 5A, and 5B. Particularly, in these diagrams, thicker arrows represent respective transfers of the telephone call amongst components, while thinner arrows represent the exchange of messages/data between components. Also, in the description of these figures, reference will be made to corresponding operations previously described in connection with FIGS. 2A-2C and 3A-3C.

Figure 4A:
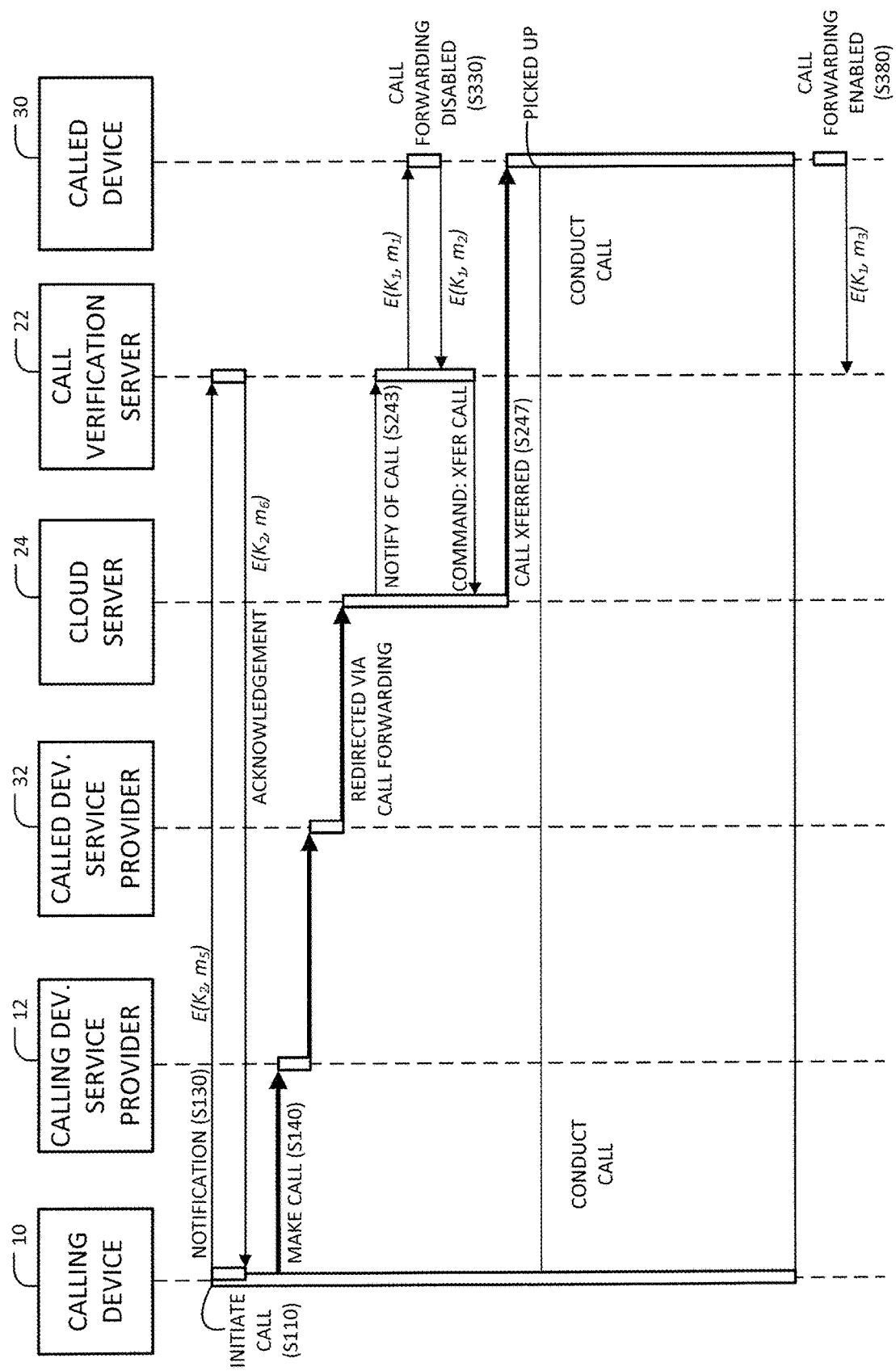
FIG. 4A is a sequential flow diagram illustrating a call flow when a call verification server verifies the legitimacy of a call originating from a telephone device equipped with a call verification application, according to an exemplary embodiment.

FIG. 4A is an example of how the present invention may operate under a scenario in which a calling device 10, which is equipped with the call verification application, makes a legitimate call to a called device 30 also equipped with the application. Particularly, FIG. 4A is a diagram illustrating the call flow under such a scenario, as well as the data/messaging flow whereby the call verification server 22 authorizes the call, according to an exemplary embodiment.

As shown in FIG. 4A, after the call is initiated by a user (S110 of FIG. 2B), the call verification application running on the device 10 determines that the called device 30 is equipped with the call verification application, and thus sends an encrypted message $E(K_2, m_5)$ notifying the call verification server 22 of the call. In response, the call verification server 22 sends an encrypted message $E(K_2, m_6)$ as an acknowledgement. The calling device 10 makes the call (S140 of FIG. 2B), and the call is forwarded from the device's 10 service provider 12 to the called device's 30 service provider 14. However, because the called device 30 has already enabled call forwarding (S310 of FIG. 2A), the call is redirected to the third party service provider 20, specifically to the cloud server 24. At this point, an automated script (e.g., a web API script) running on the cloud server 24 notifies the call verification server 22 about the call (S243 of FIG. 3C), and waits for a command from the call verification server 22. Since the call verification server 22 has already received a corresponding notification from the calling device 10 (S223 of FIG. 3A), the server 22 verifies the call is legitimate, and transmits an encrypted message $E(K_1,$ md instructing the called device 30 to disable call forwarding (S225 of FIG. 3A). In response, the called device 30 disables call forwarding (S330 of FIG. 2A), and notifies the call verification server 22 of this via encrypted message $E(K_1, m_2)$. Accordingly, the call verification server 22 issues a command to the automated script running on cloud server 24 to forward the call to the called device 30. After the cloud server 24 forwards the call to the called device 30 (see S247 of FIG. 3C), the user of the called device 30 may pick up to conduct the call with the calling device 10. Upon conclusion of the call, the called device 30 again enables call forwarding (see S380 of FIG. 2A), and notifies the call verification server 22 of this via encrypted message $E(K_1, m_3)$.

FIG. 4B is an example of how the present invention may deal with the scenario where a malicious caller is spoofing a telephone device 10, which is equipped with the call verification application. Particularly, FIG. 4B is a diagram illustrates how the call verification server 22 is able to reject the spoofer's call to a called device 30 equipped with the application, according to an exemplary embodiment.

In FIG. 4B, after the spoofer initiates the call to the called device 30, the called device's 30 service provider 32 redirects the call via call forwarding to the third party service provider 20, specifically to the cloud server 24. This prompts an automated script (e.g., a web API script) running on the cloud server 24 to inform the call verification server 22 of the call (and the originating telephone number). Since the call verification server 22 was not timely notified of the call by a calling device (S223 of FIG. 3A), the call verification server 22 checks the originating telephone number and determines the number is assigned to a device 10 equipped with the call verification application (S2241 and S2242 of FIG. 3B). Accordingly, the call verification server 22 transmits an encrypted message $E(K_2, m_7)$ to the device 10 inquiring about the call (S2243 of FIG. 3B). When the device 10 responds with an encrypted message $E(K_2, m_8)$ indicating that it made no such call, the call verification server 22 sends a command to the automated script on the cloud server 24 to reject the call. Thus, the spoofer's call is effectively blocked.

Figure 5A:
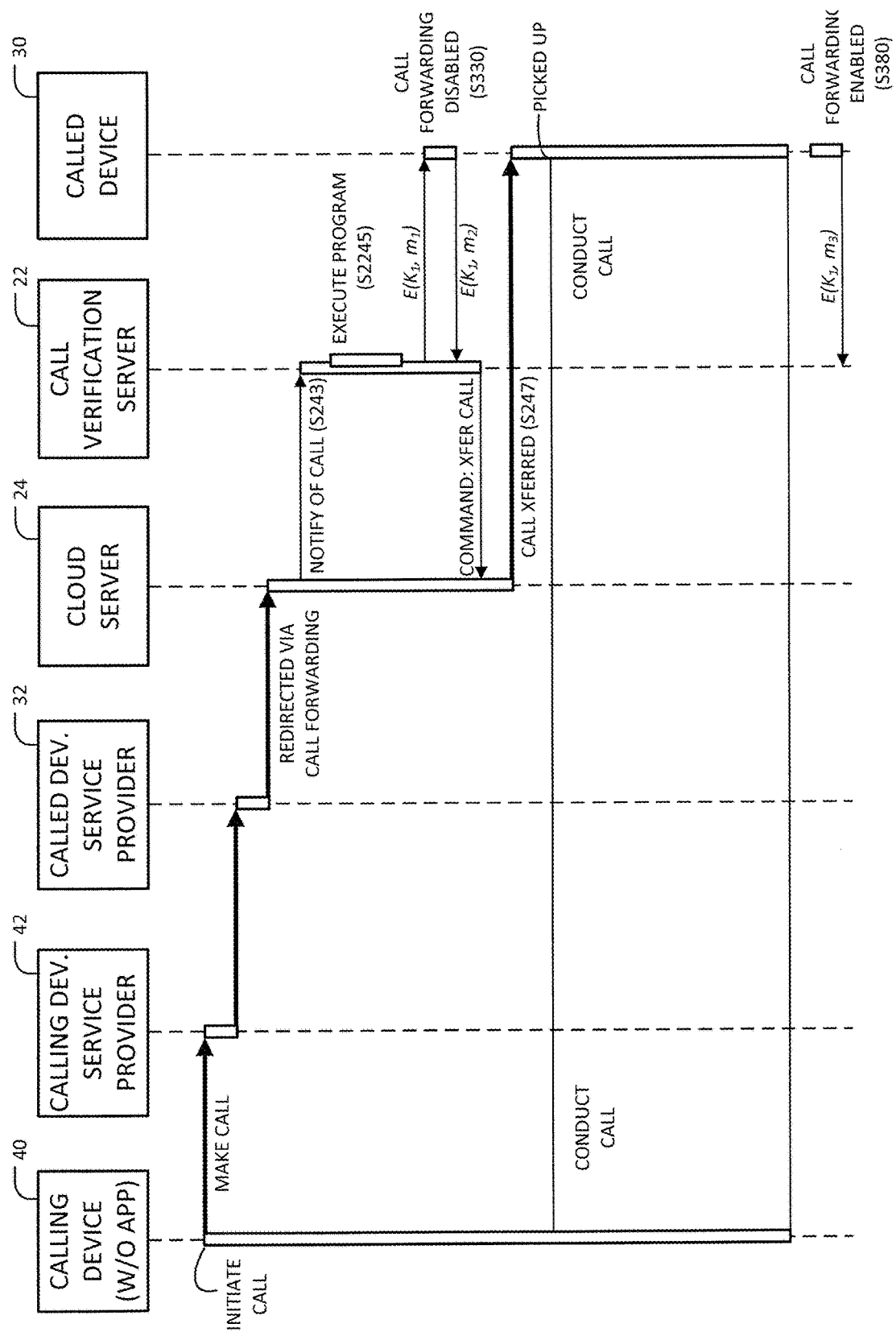
FIG. 5A is a sequential flow diagram illustrating a call flow when call verification server verifies the legitimacy of a call originating from a telephone device that is not equipped with the call verification application, according to an exemplary embodiment.

FIG. 5A illustrates a scenario in which a legitimate call is made to the called device 30, which is equipped with the call verification application, from a calling device 40 not equipped with the application. Particularly, FIG. 5A shows an example of how the call verification server 22 authorizes such a call, according to an exemplary embodiment.

According to FIG. 5A, when the call is initiated by the calling device 40, the call flows from the calling device's service provider 42 to the called device's 30 service provider 32, and is redirected to the cloud server 24 via call forwarding. This is similar to the scenario in FIG. 4A except that, since the calling device 40 is not equipped with the call verification application, it does not notify the call verification server 22 of the call. In FIG. 5A, when the cloud server 24 receives the redirected call, an automated script (e.g., a web API script) notifies the call verification server 22 (S243 of FIG. 3C). Since the call verification server 22 was not notified about the call from the calling device 40 (S223 of FIG. 3A), the server 22 checks the originating telephone number of the call and determines that the corresponding device is not equipped with the application (S2241 and S2242 of FIG. 3B). Thus, the call verification server 22 executes a computer program designed to analyze the call to determine whether or not it is legitimate (S2245 of FIG. 3B). As described above, this program may execute any of various proprietary technologies for detecting a potential malicious caller, such as those described in U.S. Pat. No. 9,037,113B2 and the aforementioned publication "Phoneypot: Data-driven Understanding of Telephony Threats" by Payas Gupta et al., the contents of both of these documents being incorporated herein by reference. As shown in FIG. 5A, the executed program decides that the call and caller are legitimate, and thus the call should be authorized (or verified as legitimate). Thus, the call application server 22 instructs the called device 30 to disable call forwarding, via encrypted message $E(K_1, m_1)$, and further commands the automated script running on cloud server 24 to transfer the call to the called device 30. Once the call is transferred and picked up, the called device 30 conducts the call with the calling device 40. At the conclusion of the call, the called device 30 enables call forwarding again (S380 of FIG. 2A).

FIG. 5B is directed to a scenario where a telephone device, which is not equipped with the call verification application, is spoofed. FIG. 5B shows how the call verification server 22 is the spoofer's call when it is directed to a called device 30 equipped with the application, according to an exemplary embodiment.

According to FIG. 5B, the spoofer initiates a call intended for the called device 30, and the call is redirected, via call forwarding, to the cloud server 24. An automated script (e.g., a web API script) running on the cloud server 24 notifies the call verification server 22 about the call (S243 of FIG. 3C). Since the call verification server 22 was not notified of the call by a calling device (S223 of FIG. 3A), the server 22 looks at the originating telephone number of the call and decides that the corresponding device is not equipped with the application (S2241 and S2242 of FIG. 3B). Thus, the call verification server 22 executes the computer program for verifying the call's legitimacy (S2245 of FIG. 3B). In the scenario of FIG. 5B, the program indicates that call is not legitimate (i.e., the caller should not be trusted), and thus the call verification server 22 commands the automated script to reject the call. Thus, the call is blocked.

It should be noted that the flowcharts in FIGS. 2A-2C and FIGS. 3A-3C, as well as the sequential flow diagrams of FIGS. 4A, 4B, 5A, and 5B, are provided for purposes of illustration only, and are not intended to be limiting on the present invention as defined by the attached claims. The processes disclosed in these figures may be modified and still remain within the spirit and scope of the present invention. For instance, whereas each of these figures illustrates a sequence of operations, the order of the operations in these figures may be changed, and certain operations illustrated in these figures may be omitted while other operations not shown may be added. Similarly, the structures and configurations illustrated in FIGS. 1A, 1B, 1C, 1D, and 1E are also provided for purposes of illustration only. The system illustrated in these figures may be modified in any manner that is consistent with the spirit and scope of the invention.

Also, while particular embodiments have been described above for purposes of example, they are not intended to be limiting on the present invention whose metes and bounds have been defined in the accompanying claims.

What is claimed is:

1. A computer-implemented method comprising:
receiving, by a computer from a server at a prescribed location, an indication of a phone call to a called device, the indication being based upon a pre-enabled call forwarding of the phone call based on an instruction from the called device; and
in response to the computer verifying the legitimacy of the phone call:
transmitting, by the computer, a request to the called device to disable the pre-enabled call forwarding, thereby allowing the called device to receive the phone call.

2. The computer-implemented method of claim 1, wherein the pre-enabled call forwarding is through a call verification application on the called device, the verification application being configured to communicate with a service provider of the called device to forward the phone call to a prescribed location.

3. The computer-implemented method of claim 1, wherein the verification of the legitimacy of the phone call comprises:
receiving, by the computer, a notification from a calling device that the phone call was initiated by the calling device; and
verifying, by the computer, the legitimacy of the phone call in response to receiving the notification.

4. The computer-implemented method of claim 3, wherein the verification of the legitimacy of the phone call in response to receiving the notification comprises:
verifying, by the computer, the legitimacy of the phone call in response to receiving the notification within a predetermined time of receiving the indication of the phone call.

5. The computer-implemented method of claim 1, wherein the verification of the legitimacy of the phone call comprises:
extracting, by the computer, an originating phone number of the phone call from a message containing the indication of the phone call;
identifying, by the computer, a device assigned to the originating phone number;
in response to the computer determining that the identified device has a call verification application:
transmitting, by the computer to the call verification application in the identified device, a request to confirm whether the identified device made the phone call; and
verifying, by the computer, the legitimacy of the phone call in response to the computer receiving from the identified device a confirmation that the identified device made the phone call.

6. The computer-implemented method of claim 5, further comprising:
transmitting, by the computer, a request to block the phone call in response to the computer receiving an indication that the identified device did not make the phone call.

7. The computer-implemented method of claim 5, further comprising:
in response to the computer determining that the identified device does not have a call verification application:
executing, by the computer, a stored verification program to verify the legitimacy of the phone call.

8. The computer-implemented method of claim 5, wherein at least one of the request to confirm whether the identified device made the phone call and the confirmation that the identified device made the phone call is encrypted.

9. The computer-implemented method of claim 1, further comprising:
in response to the computer determining that a concluding event associated with the phone call has occurred:
transmitting, by the computer to the called device, a request to enable call forwarding.

10. The computer-implemented method of claim 9, wherein the concluding event associated with the phone call is at least one of: the called device hanging up on the phone call after having picked up the phone call and the phone call being terminated by an originating party before being picked up by the called device.

11. A system comprising:
a non-transitory storage medium containing a plurality of computer program instructions; and
a processor electrically coupled to the non-transitory storage medium and configured to execute the computer program instructions:
receive from a server of a prescribed location an indication of a phone call to a called device, the indication being based upon a pre-enabled call forwarding of the phone call based on an instruction from the called device; and
in response to the processor verifying the legitimacy of the phone call:
transmit a request to the called device to disable the pre-enabled call forwarding, thereby allowing the called device to receive the phone call.

12. The system of claim 11, wherein the pre-enabled call forwarding is through a call verification application on the called device, the verification application being configured to communicate with a service provider of the called device to forward the phone call to a prescribed location.

13. The system of claim 11, wherein the processor is configured to further execute the computer program instructions to:
receive a notification from a calling device that the phone call was initiated by the calling device; and
verify the legitimacy of the phone call in response to receiving the notification.

14. The system of claim 13, wherein the processor is configured to further execute the computer program instructions to:

verify the legitimacy of the phone call in response to receiving the notification within a predetermined time of receiving the indication of the phone call.

15. The system of claim 11, wherein the processor is configured to further execute the computer program instructions to:
- extract an originating phone number of the phone call from a message containing the indication of the phone call;
- identify a device assigned to the originating phone number;
- in response to the processor determining that the identified device has a call verification application:
  - transmit to the call verification application in the identified device, a request to confirm whether the identified device made the phone call; and
  - verify the legitimacy of the phone call in response to the processor receiving from the identified device a confirmation that the identified device made the phone call.

16. The system of claim 15, wherein the processor is configured to further execute the computer program instructions to:
- transmit a request to block the phone call in response to the processor receiving an indication that the identified device did not make the phone call.

17. The system of claim 15, wherein the processor is configured to further execute the computer program instructions to:
- in response to the processor determining that the identified device does not have a call verification application:
  - execute a stored verification program to verify the legitimacy of the phone call.

18. The system of claim 15, wherein at least one of the request to confirm whether the identified device made the phone call and the confirmation that the identified device made the phone call is encrypted.

19. The system of claim 11, wherein the processor is configured to further execute the computer program instructions to:
- in response to the processor determining that a concluding event associated with the phone call has occurred:
  - transmit to the called device, a request to enable call forwarding.

20. The system of claim 19, wherein the concluding event associated with the phone call is at least one of: the called device hanging up on the phone call after having picked up the phone call and the phone call being terminated by an originating party before being picked up by the called device.

\* \* \* \* \*